UNITED STATES PATENT OFFICE.

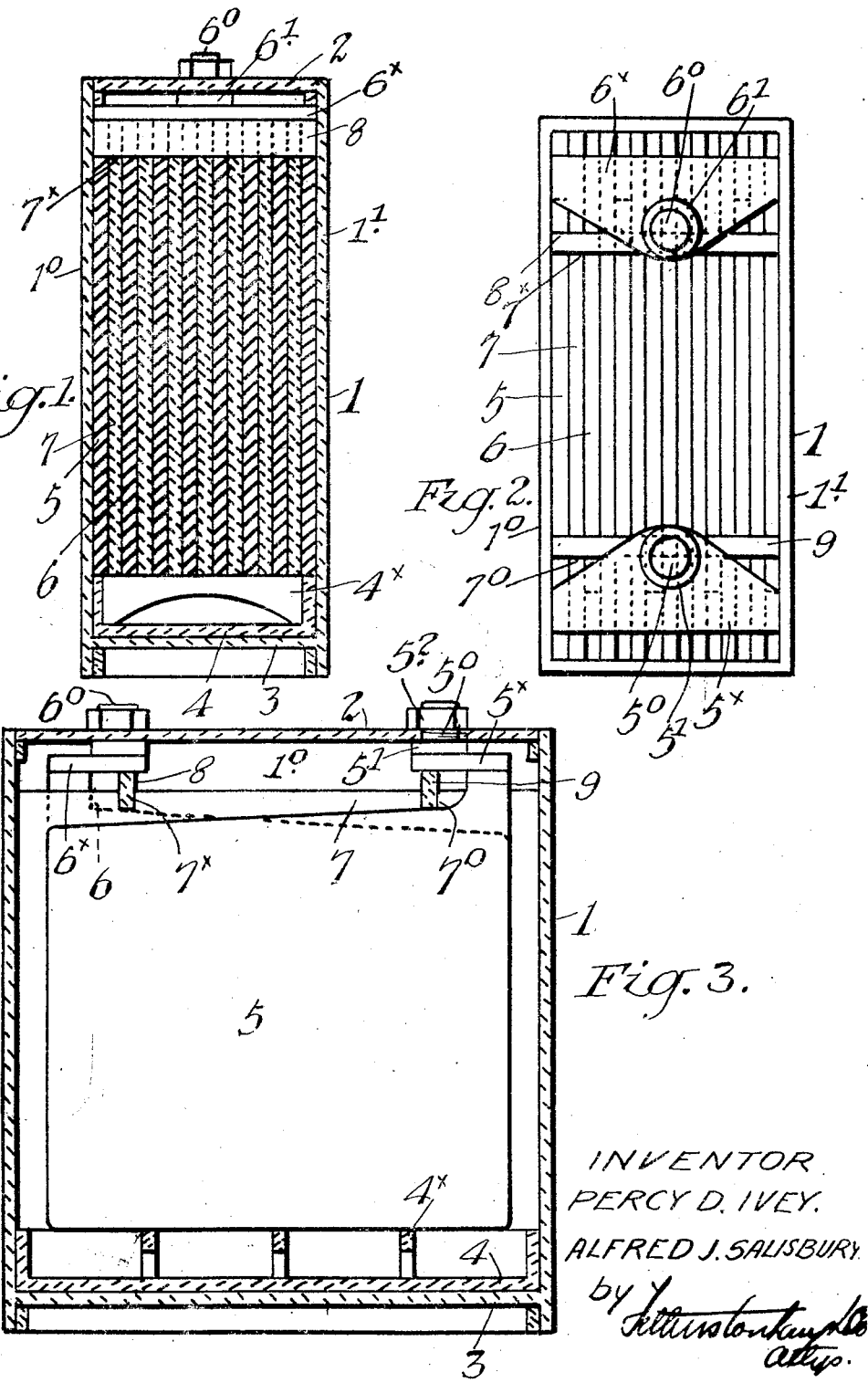

PERCY DOUGLAS IVEY, OF GUELPH, ONTARIO, AND ALFRED JAMES SALISBURY, OF TORONTO, ONTARIO, CANADA, ASSIGNORS, BY DIRECT AND MESNE ASSIGNMENTS, TO THE IVEY STORAGE BATTERIES, LIMITED, OF TORONTO, CANADA, A CORPORATION OF ONTARIO.

BATTERY-CELL.

1,354,256.   Specification of Letters Patent.   Patented Sept. 28, 1920.

Application filed April 14, 1919. Serial No. 290,051.

*To all whom it may concern:*

Be it known that we, PERCY DOUGLAS IVEY, of the city of Guelph, in the county of Wellington, in the Province of Ontario, Canada, and ALFRED JAMES SALISBURY, of the city of Toronto, in the county of York, in the Province of Ontario, Canada, have invented certain new and useful Improvements in Battery-Cells, of which the following is the specification.

Our invention relates to improvements in battery cells and the object of the invention is to devise means for strengthening the wall structure of the cell which will at the same time form means for holding the plates and spacing members definitely in position within the cell and it consists essentially of the following arrangement and construction of parts as hereinafter more particularly explained.

Figure 1, is a sectional view of a battery cell constructed in accordance with our invention.

Fig. 2, is a plan view showing the top of the battery cell removed.

Fig. 3, is a sectional view through the battery cell showing the plates and spacers in elevation.

In the drawings like characters of reference indicate corresponding parts in the various figures.

1 indicates the cell of the battery provided with a top 2 and bottom 3. 4 indicates a tray located in the bottom of the cell and provided with cross bridging portions $4^x$ which serve to support the plates and spacers within the battery cell. The tray 4 fits the lower portion of the cell and serves also to form a reinforcement therefor as well as to form a draining space in which may be located a drain orifice at any suitable point. 5 and 6 indicate the opposing sets of battery plates which rest upon the bridging portions $4^x$ at the bottom. 7 indicate wooden spacers which intervene between each pair of plates, such space being provided with notches $7^x$ and $7^y$ in their upper edges. The plates 6 are connected together by a strap member $5^x$ from which extends the terminal screw $5°$ through an orifice in the top 2 of the cell, the strap $5^x$ being provided with a shoulder $5'$ bearing against the lower face of the cell top, the nut $5^2$ being threaded upon the stem against the outer face of the cell top. The battery plates 6 are similarly connected together by a strap $6^x$ provided with a terminal screw $6°$ having a shoulder $6'$ bearing against the lower face of the battery top and a nut $6°$ bearing against the upper face.

8 and 9 indicate tie members extending across the cell from one side wall $1°$ to the opposite side wall $1'$ to which the ends of the tie members are secured by a suitable cement. The tie members pass through the alined notches $7^x$ and $7°$, the tie member 8 bearing upon the upper edge of the plates 5 and the tie member 9 bearing upon the upper edge of the plates 6, the straps $5^x$ and $6^x$ bearing upon the tie members. By this means it will be seen that not only are the side walls $1'$ and $1°$ of the battery cell tied together and thereby reinforced but also the plates 5 and 6 and spacing member 7 are held definitely in position within the battery cell thereby holding all the parts firmly together to make a rigid unit.

From this description it will be seen that we have devised a very simple structure whereby a battery cell may be reinforced and the plates and spacing members held firmly in place therein.

In assembling we properly group the electrodes and place the tie members in position in the notches previous to inserting in the cell. We then insert the grouped electrodes into the cell so as to rest on the bridges of the tray. After this is done the tie members are cemented or otherwise secured at both ends thereof to the walls of the cell, so that they are rigid and thereby hold the electrodes from both vertical and lateral displacement.

The cover of the cell is afterward placed in position and all sealing members and terminals are secured and the lid properly sealed.

What we claim as our invention is.

1. In a storage battery cell, the combination with the walls and supporting ribs or bridges at the bottom of the cell, and the plates, of tie members extending across the cell and secured to the wall thereof and adapted to hold the plates rigidly on to the lower supporting ribs.

2. In a storage battery cell, tie members extending across and above the top of the plates and secured to the sides and adapted to hold the plates from vertical and lateral displacement.

PERCY DOUGLAS IVEY.
ALFRED JAMES SALISBURY.

Witnesses:
B. BOYD,
W. D. POGSON.